(12) United States Patent
Kunda et al.

(10) Patent No.: US 11,190,511 B2
(45) Date of Patent: Nov. 30, 2021

(54) GENERATING AUTHENTICATION INFORMATION INDEPENDENT OF USER INPUT

(71) Applicant: salesforce.com, inc., San Francisco, CA (US)

(72) Inventors: Jagadeesh Kunda, Sammamish, WA (US); Ariel Anant Chavan, Seattle, WA (US); Qian Han, Woodinville, WA (US); Yifan Wang, Bothell, WA (US); Kamran Riaz Khan, Redmond, WA (US); Vishal Agarwal, Woodinville, WA (US)

(73) Assignee: salesforce.com, inc., San Francisco, CA (US)

( * ) Notice: Subject to any disclaimer, the term of this patent is extended or adjusted under 35 U.S.C. 154(b) by 316 days.

(21) Appl. No.: 16/261,217

(22) Filed: Jan. 29, 2019

(65) Prior Publication Data
US 2020/0244659 A1 Jul. 30, 2020

(51) Int. Cl.
*H04L 29/06* (2006.01)
*G06F 21/45* (2013.01)

(52) U.S. Cl.
CPC .......... *H04L 63/0884* (2013.01); *G06F 21/45* (2013.01); *H04L 63/0838* (2013.01);
(Continued)

(58) Field of Classification Search
CPC ............ H04L 63/0884; H04L 63/0838; H04L 2463/062; H04L 63/0815; G06F 21/45;
(Continued)

(56) References Cited

U.S. PATENT DOCUMENTS 9,871,779 B2    1/2018  Shelter et al.
2002/0174422 A1* 11/2002 Kelley .................. G06F 8/65
                                              717/178
(Continued)

OTHER PUBLICATIONS

Universal 2nd Factor (U2F) Overview, FIDO Alliance Proposed Standard Apr. 11, 2017, 163 pages.
(Continued)

*Primary Examiner* — Jeffrey C Pwu
*Assistant Examiner* — William A Corum, Jr.
(74) *Attorney, Agent, or Firm* — Kowert, Hood, Munyon, Rankin & Goetzel, P.C.

(57) ABSTRACT

Techniques are disclosed relating to generating authentication information independent of user input. In some embodiments, an authentication application repeatedly performs operations to authenticate a client application to one or more hosts of a server system during an automated tasks. In some such embodiments, an instance of the operations includes receiving, from the client application, a request to generate authentication information. In response to the request, the authentication application may retrieve authentication data for the user and, independent of user input, generate an item of authentication information based on the authentication data. The authentication application may then output the item of authentication information to the client application, where the item of authentication information is usable by the client application to authenticate to at least one of the one or more hosts.

18 Claims, 6 Drawing Sheets

(52) U.S. Cl.
CPC ............... *G06F 2221/2117* (2013.01); *G06F 2221/2137* (2013.01)

(58) Field of Classification Search
CPC ..... G06F 2221/2117; G06F 2221/2137; G06F 2221/2129; G06F 21/44; G06F 21/34
See application file for complete search history.

(56) References Cited

U.S. PATENT DOCUMENTS

| | | |
|---|---|---|
| 2005/0081045 A1 | 4/2005 | Nicodemus et al. |
| 2014/0181894 A1 | 6/2014 | Von Bokern et al. |
| 2015/0373007 A1 | 12/2015 | Sheller et al. |
| 2016/0112412 A1* | 4/2016 | Roth .................... G06F 21/34 726/6 |
| 2016/0127351 A1 | 5/2016 | Smith et al. |
| 2016/0277439 A1 | 9/2016 | Rotter et al. |
| 2016/0292408 A1 | 10/2016 | Zhang et al. |
| 2016/0371475 A1 | 12/2016 | Zhao et al. |
| 2018/0034803 A1 | 2/2018 | Aggarwal et al. |
| 2018/0041503 A1 | 2/2018 | Lindemann |
| 2018/0191695 A1 | 7/2018 | Lindemann |
| 2019/0036924 A1 | 1/2019 | Wang et al. |
| 2019/0052627 A1* | 2/2019 | Ferreira ................. G06F 21/35 |
| 2019/0288998 A1* | 9/2019 | Johansson ........... H04L 63/0281 |
| 2019/0297075 A1* | 9/2019 | Kaladgi ................ H04L 9/0891 |
| 2019/0306155 A1* | 10/2019 | Girdhar ............... H04L 9/3239 |
| 2020/0366669 A1* | 11/2020 | Gupta ............. G06K 19/06028 |
| 2020/0389314 A1* | 12/2020 | Kunnath ............ H04L 63/0815 |

OTHER PUBLICATIONS

D. M'Raihi, et al., "HOTP: An HMAC-Based One-Time Password Algorithm," Network Working Group, Request for Comments: 4226, Category: Informational, Copyright (C) The Internet Society (2005), 37 pages.

D. M'Raihi, et al., "TOTP: Time-Based One-Time Password Algorithm," Internet Engineering Task Force (IETF), Request for Comments: 6238, Category: Informational, ISSN: 2070-1721, May 2011, 16 pages.

Yubico, The YubiKey Manual, Usage, configuration and introduction of basic concepts, Version: 3.4, Date: Mar. 27, 2015, 40 pages.

* cited by examiner

GENERATING AUTHENTICATION INFORMATION INDEPENDENT OF USER INPUT

BACKGROUND

Technical Field

This disclosure relates generally to user authentication, and more particularly to generating authentication information independent of user input.

Description of the Related Art

Server computer systems, such as web servers, application servers, etc., may provide various computing resources and services to an end user. For example, a web service may provide access to software applications to remote users using a large number of host computer systems in a datacenter facility. A web service will typically limit access to its resources and services to only those users with a valid user account with the service. One method for limiting access to a web service is to require an end user to establish a user account and authentication credentials (e.g., a username and password), and to require end users to provide valid authentication credentials prior to gaining access to the service. To further improve security, some web services implement possession-based authentication techniques in which the requesting user is required to demonstrate that they have possession of a particular physical item, e.g., by pressing a button on a physical security token to generate authenticating information. For some uses, however, authentication techniques that require user input may be impractical and infeasible such that user authentication cannot be performed for those uses.

DETAILED DESCRIPTION

Server systems implement various user authentication techniques in an effort to limit unauthorized access to computing services. As noted above, many such authentication techniques rely on user input to generate authenticating information. For example, one common technique is to require a requesting user to provide authentication credentials (such as a password, PIN code, etc.) that may be validated (e.g., by the server system or a separate authentication server system) prior to providing the user with access to a user account. In some instances, however, the use of such authentication credentials may present various security concerns. For example, in the event that a user's authentication credentials are compromised, an unauthorized third-party may access the user's account to the same extent as the valid user.

To address this shortcoming, some authentication techniques verify the identity of the user (instead of or in addition to conventional authentication credentials) on the basis of something that the valid user—and, presumably, only the valid user—has possession of, such as a physical security token (e.g., a YubiKey™), a linked cell phone, etc. Consider, as one non-limiting example, the use of a physical security token for a user to authenticate to a server system. In such instances, the user connects the physical security token to the user's device (e.g., via USB, NFC, Bluetooth, etc.) and provides some form of input—pressing a button on the token, scanning a fingerprint, etc.—to cause the token to generate authentication information. This authentication information may then be provided to the server system to authenticate the requesting user. As another example, some possession-based authentication techniques send authentication information in an out-of-band message to the requesting user, such as a one-time passcode ("OTP") sent in an SMS message to a cell phone associated with the valid user's account. The valid user may then provide the authentication information, e.g., through a web form, to the server system for authentication.

These possession-based authentication techniques may improve security beyond the use of authentication credentials alone, but they too suffer from various shortcomings. For example, as noted above, these authentication techniques require some type of user input or direction (e.g., pressing a button, scanning a fingerprint, inputting an OTP, etc.) to provide authentication information to the server system. While this may be acceptable for some circumstances (e.g., authenticating a user during a login process), it is entirely impractical in others.

Figure 1:
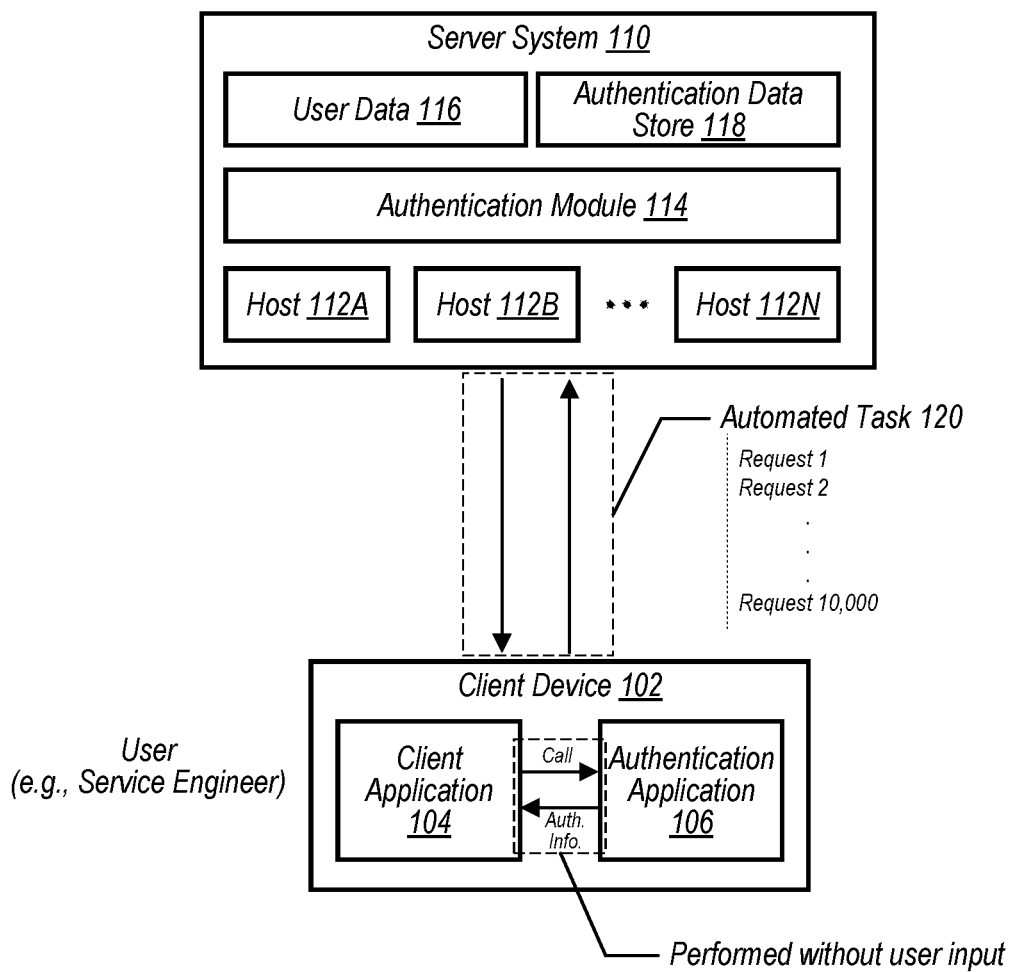
FIG. 1 is a block diagram in which an authentication application repeatedly performs operations to authenticate a client application to one or more hosts of a server system during an automated task, according to some embodiments.

With reference to FIG. 1, for example, consider an instance in which a user, such as a service engineer, sends requests to large number of hosts 112 (e.g., to 10,000 or more hosts) within server system 110 to perform an automated task. As used herein, the term "automated task" refers to a computing operation that, once initiated, is performed with little or no user interaction or direction, such as a patch operation or any other similar maintenance operation. In many instances, an automated task will involve a large number (e.g., thousands, millions) of computing operations to be performed without user direction (e.g., once initiated). Such automated tasks may typically be designed such that requests are sent to a large number of host computer systems within a relatively short period of time (e.g., ten seconds, five minutes, two hours, etc.) such that the automated task may be completed quickly. In various embodiments, it would be desirable to authenticate the requesting user for each host that the user is attempting to access, for example by enabling multi-factor authentication ("MFA") on the hosts 112. Using authentication techniques that rely on user input, however, performing user authentication would be impractical and infeasible. For example, it would be impractical for the user to press a button on a physical security token 10,000 times or to input 10,000 OTPs from his or her cell phone simply to perform a routine patch operation. Such an authentication technique would be unduly burdensome for the user and cause the automated task to take a significant amount of time to complete.

In various embodiments, however, the disclosed systems and methods may ameliorate these and other technical problems by enabling the client device to generate authentication information independent of user input. Stated differently, various disclosed embodiments enable the client device to generate items of authentication information without user input. This authentication information may then be used to authenticate to one or more hosts of a server system, for example during an automated task, in a way that increases security for the server system 110 without burdening the user or significantly increasing the time required to complete the automated task.

FIG. 1 depicts a block diagram 100 in which a user of client device 102 is performing an automated task 120 on one or more hosts 112 of server system 110. Note that, although shown in direct connection, client device 102 and server system 110 may be connected via one or more communication networks (not shown for clarity). In various embodiments, server system 110 may host a web service accessible to various remote users via one or more communication networks. For example, server system 110 may host an email service, streaming media service, customer-relationship management ("CRM") software applications or data, or any other suitable web service, according to various embodiments. In some embodiments, server system 110 may be implemented in a datacenter environment in which a large number of hosts 112 (e.g., 10,000, 50,000, etc.) are used to provide various web pages, applications, and data to remote users. Further, in some embodiments, server system 110 may be (or be included in) a multi-tenant computer system that provides computing resources for a plurality of tenants, each of which may include any suitable number of users.

In the depicted embodiment, server system 110 includes (or has access to) user data 116 associated with various user accounts. This user data 116 may include various items of information associated with the user accounts, the service provided by server system 110, etc. Server system 110 further includes authentication data store 118, which may store authentication data associated with various users. Server system 110 also includes authentication module 114, which, in various embodiments, is operable to determine whether to authenticate a requesting user or client application 106 of client device 102 to one or more of the hosts 112. In various embodiments, authentication module 114 uses authentication data from authentication data store 118 in making this determination. As used herein, "authentication data" refers to one or more parameters, such as cryptographic keys, seed values, counter values, identifier values, etc., that are used to generate items of authentication information. As used herein, an "item of authentication information" refers to a piece of information that may be used as an authentication factor to authenticate a requesting user to a host 112. As described in more detail below with reference to FIG. 4A, an item of authentication information may include both a static portion (e.g., an identifier value) and a dynamic portion (e.g., an encrypted OTP) and be used by a client application to authenticate to one or more hosts 112 in server system 110.

In FIG. 1, client application 104 is shown executing on client device 102. In various embodiments, client application 104 is an application that is operable to perform an automated task on one or more hosts of the server system 110. Note that, rather than a standalone application, client application 104, in some embodiments, may instead be an automation script or automation tool created to perform a particular automated task associated with one or more of the hosts 112, data managed by the server system 110, user data 116, etc. Client device 102 is further shown executing authentication application 106, which, in various embodiments, is an application (e.g., a binary executable, etc.) operable to generate items of authentication information—without user input—in an on-demand manner as requested by the client application 104. Note that, in some embodiments, authentication application 106 may generate authentication information for various different applications or scripts executing on the client device 102, and not solely for client application 104, according to various embodiments.

In the depicted embodiment, the service engineer is using the client application 104 to perform an automated task on a set of 10,000 hosts 112 of server system 110. In some embodiments, the client application 104 may perform the automated task on each of the hosts 112 in the set sequentially, completing the task on one host before moving onto the next. For example, the client application 104 may send a request to a first host 112A, provide one or more items of authentication information, and, once authenticated, perform the desired actions on the host 112A. After it has finished with the first host 112A, client application 104 may proceed in the same manner with the remaining hosts 112 in the set until the automated task 120 is complete.

To authenticate to each of the hosts 112, the client application 104 calls the authentication application 106 (e.g., via a function call) requesting an item of authentication information, such as an OTP. As described in more detail below with reference to FIG. 3, authentication application 106 generates an item of authentication information—independent of any input from the user—and outputs it to the requesting client application 104. That is, in various embodiments, authentication application 106 is operable to generate items of authentication information automatically as requested by the client application 104. The client application 104 may then provide the item of authentication information to the server system 110 for verification by authentication module 114. Since the authentication application 106 is able to generate the items of authentication information without any user input (for example, without the user pressing a physical button, typing an OTP sent via SMS or email to the user, etc.), this authentication information may be generated and provided to the server system 110 quickly, allowing the client application 104 to authenticate to the various hosts 112 and complete the automated task 120 in a relatively short period of time. Accordingly, various disclosed embodiments may allow for dynamic user authentication during automated tasks in a way that increases security for the server system 110 without burdening the user or significantly increasing the time required to complete the automated task 120. Further, various disclosed embodiments may improve security at hosts 112 and access points within the infrastructure of server system 110 by allowing automated tools and scripts to be run on MFA-enable hosts 112. Thus, in various embodiments, the disclosed systems and methods may improve data security for both the server system 110 and its users, thereby improving the functioning of the system as a whole.

Figure 2:
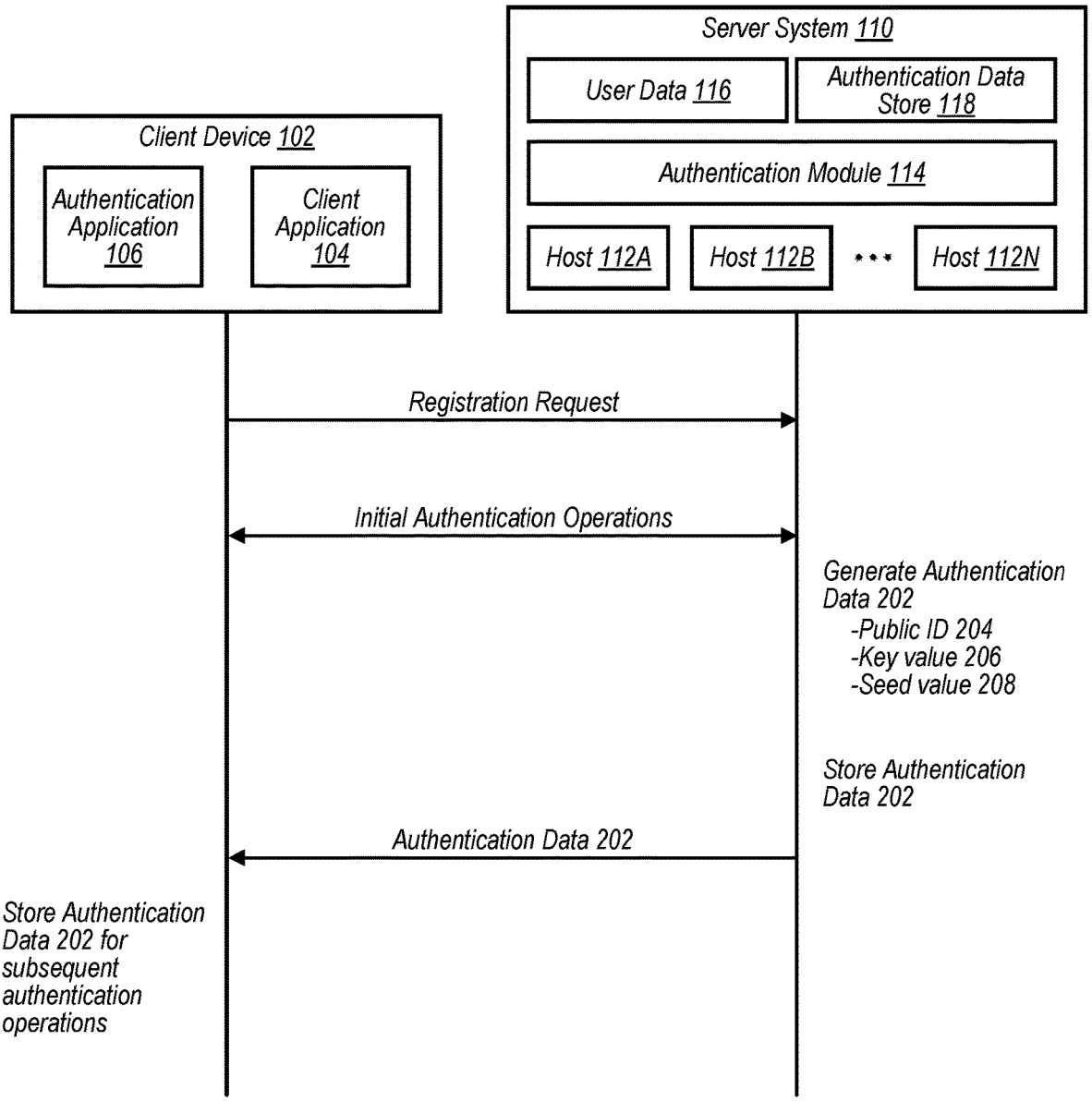
FIG. 2 is a block diagram illustrating an example exchange for registration operations between a client device and a server system, according to some embodiments.

Turning now to FIG. 2, a communication diagram is depicted illustrating an example exchange 200 for registration operations between client device 102 and server system 110, according to some embodiments. More specifically, exchange 200 depicts a process in which a user of client device 102 registers authentication application 106 for use in authentication operations with the authentication module 114 during automated tasks. Note that, in various embodiments, the process depicted in exchange 200 may be performed prior to the authentication operations described herein (e.g., prior to authentication application 106 generating items of authentication information for use by client application 104).

In the depicted embodiment, authentication application 106, executing on client device 102, sends a registration request to server system 110. In various embodiments, this registration request is a request for the authentication module 114 to generate and provision authentication data 202 to the authentication application 106. As described herein, such authentication data 202 may then be used by the authentication application 106 to repeatedly generate items of authentication information (e.g., OTPs) for the client application 104. As such, this authentication data 202 is sensitive and, as shown in FIG. 2, the user may be required to perform various authentication operations before the authentication data will be provisioned. As one non-limiting example, the user of client device 102 may be required to provide authentication credentials (e.g., a username and password) along with some other authentication factor, such as authentication information generated by a physical security token. Note, however, that the initial authentication operations depicted in FIG. 2 are independent of the repeated authentication operations described above with reference to authenticating a client application 104 to numerous hosts 112 during an automated task. Instead, these initial authentication operations are intended to ensure that the authentication data 202 is provisioned to the valid user and not a malicious third-party.

Once the initial authentication operations have been successfully performed, authentication module 114 may generate the authentication data 202. As will be appreciated by one of skill in the art with the benefit of this disclosure, the nature of the authentication data 202 may vary, according to different embodiments. In the depicted embodiment, the authentication data 202 includes a public identifier 204, a key value 206, and a seed value 208. The public identifier 204, in various embodiments, is an identifier (e.g., an alphanumeric sequence) assigned to the authentication data 202 that may be used by the authentication module 114 to retrieve the authentication data 202 during subsequent authentication operations, as described in more detail below with reference to FIGS. 3 and 4B.

Key value 206, in various embodiments, is a cryptographic key that may be used by the authentication application 106 to encrypt one or more values (e.g., an OTP) while generating an item of authentication information. For example, in some embodiments, an item of authentication information may include both the public identifier 204 and an encrypted OTP, as explained in more detail below. In such embodiments, authentication application 106 may use key value 206 to encrypt the OTPs in the items of authentication information sent to the server system 110, and authentication module 114 may use its copy of key value 206 to decrypt the OTPs so that they may be compared to locally generated versions thereof. In some embodiments, authentication application 106 and authentication module 114 may use symmetric-key algorithms, such as the Advanced Encryption Standard ("AES"), to respectively encrypt and decrypt the OTP included in an item of authentication information. In some such embodiments, key value 206 is a 128-bit key suitable for use with the AES algorithm. Note, however, that this embodiment is provided merely as an example and is not intended to limit the scope of the present disclosure. In other embodiments, any other suitable symmetric-key encryption algorithm may be used. Further, in other embodiments, authentication application 106 and authentication module 114 may use a public-key encryption scheme (e.g., RSA, El Gamal, etc.) to respectively encrypt and decrypt OTPs in items of authentication information. In such embodiments, authentication module 114 may instead generate an asymmetric key-pair 206, the public key of which may be provisioned to the authentication application 106 as part of the authentication data 202.

Authentication data 202 further includes seed value 208, which, in various embodiments, is a random or pseudo-random number that may be generated using any suitable random or pseudo-random number generation algorithm. In some embodiments, the authentication module 114 may generate the authentication data 202 by first generating a random secret value and, from that random secret value, derive the key value 206 and seed value 208. In some embodiments, the seed value 208 may be used (e.g., instead of or in addition to other values, such as a counter value, time value, etc.) as a moving factor value when generating items of authentication information, for example to avoid having a predictable moving factor for succeeding items of authentication information.

In various embodiments, authentication module 114 may then store the authentication data 202, e.g., in authentication data store 118, for use in subsequent authentication operations. For example, in some embodiments, authentication data store 118 is implemented in a database and the authentication data 202 may be stored as an entry in that database. When an item of authentication information is later presented for validation, the authentication data 202 may be retrieved from the authentication data store 118 (e.g., using the public ID 204 included in the presented item of authentication information). As shown in FIG. 2, server system 110 may send the authentication data 202 to the client device 102, where it may be stored (e.g., persistently in non-volatile memory) for future use in authenticating the client application 104 to various hosts 112 during automated tasks.

Note that, in some embodiments, authentication module 114 may impose certain limitations of the authentication data 202 provided to authentication application 106. For example, in some embodiments, authentication module 114 may impose time-based limitations on authentication data 202 such that the authentication data 202 may only be used to generate valid items of authentication information for a limited period of time (e.g., one hour, one day, one week, etc.). Other non-limiting examples of limitations that may be imposed on the authentication data 202 include use-based limitations (e.g., items of authentication information generated using such authentication data 202 are only valid for certain uses, such as performing a patch), geographic-based limitations (e.g., items of authentication information generated using the authentication data 202 are only valid when the authentication request originates from a particular geographic area), limitations on the number of authentication operations for which the authentication data 202 may be used, etc. Note that, in some embodiments, more than one type of limitation may be imposed on authentication data 202 at a time (e.g., a time-based limitation and a geographic-based limitation).

In various such embodiments, authentication module 114 may enforce these limitations using permission values assigned to the authentication data 202. For example, when authentication module 114 stores the authentication data 202 in authentication data store 118, it may also store (e.g., as one or more fields in the database entry for data 202)

information regarding any limitations that are being applied to the authentication data 202. When the server system 110 later receives an item of authentication information, authentication module 114 may retrieve this limitation information for use in determining whether to validate the authentication request.

Further note that, in some embodiments, the authentication data 202 may be revoked by the authentication module 114 such that the authentication data 202 can no longer be used by authentication application 106 to generate valid items of authentication information. Revocation of authentication data 202 may be useful in a number of situations, for example as part of a security policy to renew authentication data 202 after a certain period of time, in response to the expiration of a time-based limitation on authentication data 202, after a data breach, etc. In systems that rely on physical security tokens for authentication, the mass or frequent revocation of authentication data would be both time-consuming and logistically challenging. For example, in physical security tokens, the authentication data (e.g., key values, seed values, etc.) is typically hard-programmed into the device and, commonly, stored in a hardware security module. To delete that authentication data, an entity associated with server system 110 would need to physically collect the security tokens (e.g., via mail), delete the existing authentication data, provision updated authentication data, and redistribute the physical tokens to the users. Such a process would be both inconvenient for the user and expensive for the entity.

In various embodiments, however, the disclosed systems and methods may advantageously allow for authentication data 202 to be revoked (e.g., deleted from client device 102) and updated authentication data 202 to be provisioned in a manner that is fast and inexpensive, making the revocation and re-provisioning of authentication data 202 feasible (as opposed to revocation of authentication data for physical security tokens). For example, to revoke authentication data 202, the authentication module 114 may delete the authentication data 202 stored in authentication data store 118, for example by deleting the corresponding entry in the database. In some such embodiments, when the client application 104 subsequently attempts to authenticate to the server system 110, the item(s) of authentication information generated by authentication application 106 will not be valid. That is, the next authentication attempt using authentication information generated by the authentication application 106 based on the (now revoked) authentication data 202 will fail, according to some embodiments. If desired, the user may then initiate additional registration operations as discussed with reference to FIG. 2 to obtain updated authentication data that may be used for subsequent authentication operations. (Note that, in some embodiments, server system 110 may also send a revocation request to the authentication application 106, instructing the application 106 to delete the authentication data 202.). In various embodiments, the use of limited authentication data 202 (optionally along with the revocation of expired authentication data 202) allows the authentication module 114 to implement just-in-time authentication in which authentication data 202 is provisioned for a limited time, use, etc. and (optionally) removed from the client device 102 thereafter. In various instances, this may allow the authentication module 114 to exhibit greater control over the lifecycle of provisioned authentication data and, in turn, improve the authentication process as a whole.

In the embodiment depicted in FIG. 2, the registration request is sent to the server system 110 after the authentication application 106 is already present on the client device 102. In other embodiments, however, the user of client device 102 may instead send a registration request to the server system 110 before the authentication application 106 is provided to the client device. In some such embodiments, the user and authentication module 114 may perform various initial authentication operations as discussed above and, once authenticated, the authentication application 106 may be provisioned to the client device 102 using any suitable deployment method (e.g., Puppet™) and the server system 110 may generate and send the authentication data 202 to the client device 102. Further note that, in some embodiments, the authentication application 106 may instead generate the authentication data 202 and provide it to the authentication module 114, for example after initial authentication operations have been performed.

Figure 3:
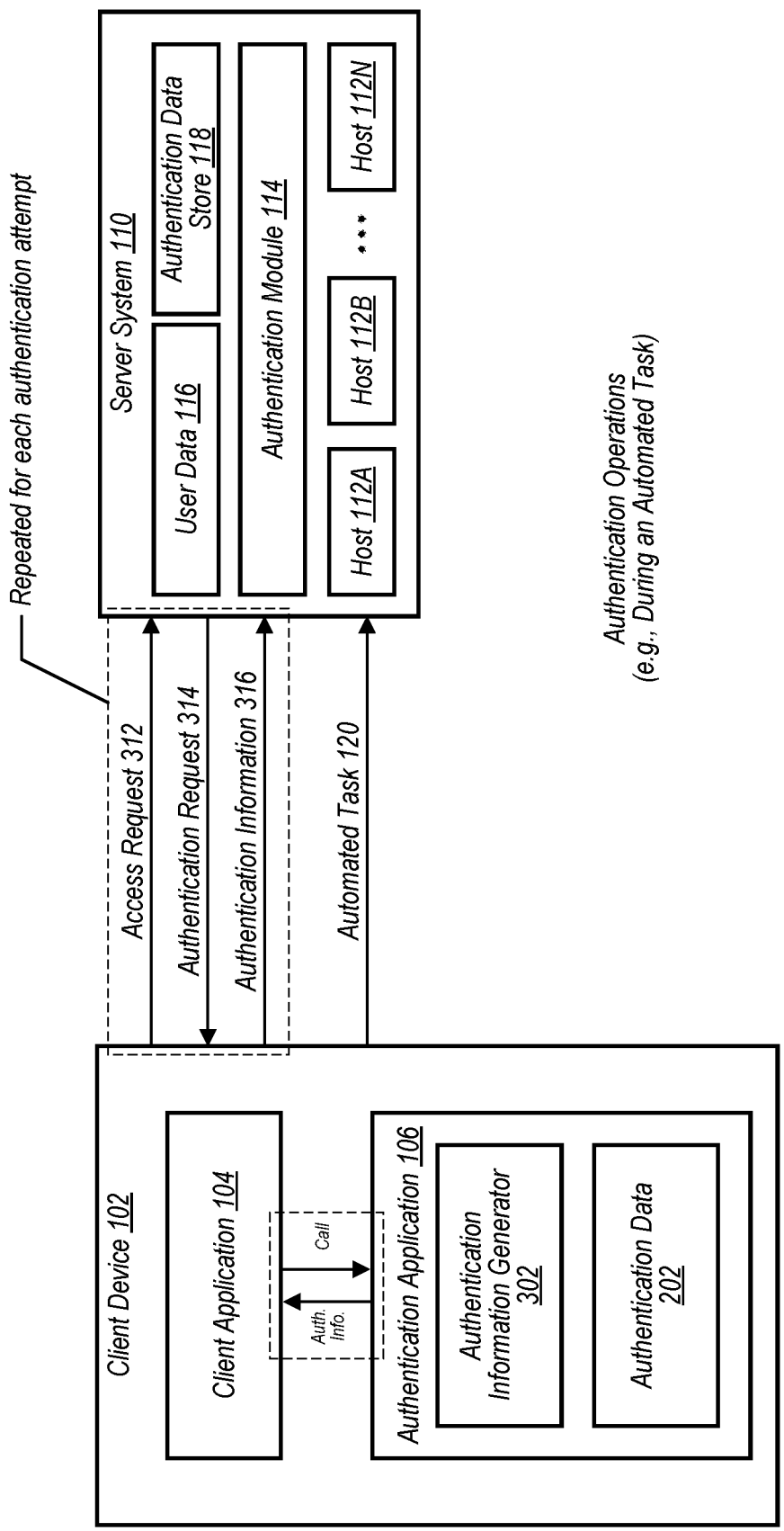
FIG. 3 is a block diagram in which a client application is authenticated to one or more hosts during an automated task, according to some embodiments.

Referring now to FIG. 3, a block diagram 300 is depicted in which a client application 104 performs an automated task on numerous (e.g., 50,000 or more) hosts 112 of the server system 110. In various embodiments, each of these hosts may be MFA-enabled such that, to authenticate to any of the hosts 112, the client application 104 must provide both authentication credentials as well as one or more items of dynamically generated authentication information.

In FIG. 3, client device 102 sends an access request 312 to a host 112A, attempting, for example, to perform a function or access a resource of host 112A. In response, server system 110 sends an authentication request 314 to the client device 102 requesting an item of authentication information from the client application 104. After receiving the authentication request 314, client application 104 may request (e.g., via a function call) an item of authentication information from the authentication application 106. As shown in FIG. 3, authentication application 106 includes authentication information generator 302 and authentication data 202. In various embodiments, authentication information generator 302 is operable to generate items of authentication information based on the authentication data 202. As noted above, authentication application 106 may generate items of authentication information using various suitable techniques. In some embodiments, items of authentication information include OTPs that may be generated using any one of various OTP-generation algorithms. For example, in some embodiments, authentication information generator 302 uses the Hashed Message Authentication Code ("HMAC")-based One-Time Password ("HOTP") algorithm, as specified by RFC 4226, to generate OTPs. Note, however, that this embodiment is provided merely as an example and is not intended to limit the scope of the present disclosure. In other embodiments, for example, authentication information generator 302 may use the Time-Based One-Time Password ("TOTP") algorithm, as specified by RFC 6238, to generate OTPs. In some embodiments, generating an OTP for an item of authentication information includes generating a string of concatenated values, including, for example, internally stored values and values generated based on authentication data 202. Non-limiting examples of such values include seed value 208, a private identifier value, a usage counter value, a timestamp value, a session usage counter value, a random number, a checksum value, etc. In some embodiments, authentication information generator 302 may generate OTPs in a manner that is consistent with the Yubico™ OTPs used by various YubiKey™ security tokens.

As discussed in more detail below with reference to FIG. 4A, an item of authentication information may include both a static portion (that is, a portion that does not change between successively generated items of authentication information) and a dynamic portion (that is, a portion that does change between successively generated items of authentication information). The static portion, in various embodiments, is the public identifier 204 provided to the authentication application 106 as part of the authentication data 202, which may be used by the authentication module 114 to retrieve its corresponding copy of the authentication data 202. In some embodiments, the dynamic portion of the item of authentication information is an OTP. In other embodiments, the dynamic portion may be an OTP that has been encrypted using the key value 206. For example, in some embodiments, the dynamic portion of an item of authentication information is an OTP that has been generated using the HOTP algorithm and encrypted using key value 206 based on the AES algorithm.

Note, however, that this embodiment is provided merely as an example and is not intended to limit the scope of the present disclosure. In other embodiments, any other suitable symmetric-key encryption algorithm may be used. Further, in some embodiments, authentication application 106 and authentication module 114 may use a public-key encryption scheme (e.g., RSA, El Gamal, etc.) to respectively encrypt and decrypt OTPs in items of authentication information. For example, in some such embodiments, authentication data 202 (received during the registration operation, discussed above) may include a public key from an RSA key-pair, and authentication application 106 may encrypt the OTP (generated using any suitable technique) using that public key. When determining whether to authenticate the client application 104, in such embodiments, the authentication module 114 may then decrypt the OTP using the corresponding RSA private key and validate the decrypted OTP.

Once an item of authentication information has been generated, it may be output to the client application 104, which may provide it to the server system 110 for validation. For example, as described in more detail below with reference to FIG. 4B, authentication module 114 may independently generate a corresponding item of authentication information (e.g., using the copy of authentication data 202 stored in authentication data store 118) and compare the two items of authentication information. If the authentication operation is successful, authentication module 114 may permit the client application 104 to perform the automated task on the host 112A before it proceeds to the next host 112. If, however, the authentication operation is not successful, authentication module 114 may take one or more appropriate actions (e.g., requiring additional authentication operations be performed, denying the client application 104 access to the host 112A, etc.).

Note that, in some embodiments, authentication credentials (e.g., a username and password) may be sent in the access request 312 or with the authentication information 316. Further note that in some embodiments, the client application 104 may be authenticated to the various hosts 112 on the basis of one or more items of authentication information without reliance on other authentication credentials (e.g., username and password) and, in such embodiments, authentication credentials are not sent to the server system 110.

Although the authentication module 114 is shown separately from the hosts 112, note that, in various embodiments, authentication module 114 may be implemented on one or more of the hosts 112. For example, in some embodiments, one or more hosts 112 may be operable to perform the operations described with reference to authentication module 114. In other embodiments, instances of authentication module 114 may be implemented on one or more dedicated hosts 112 (e.g., as part of a larger authentication layer) and, when an access request is received, the receiving host 112 may delegate the authentication operations to one of the hosts 112 that are implementing the authentication module 114.

Additionally, in some embodiments, authentication application 106 may generate items of authentication information in the same manner (e.g., using the same items of authentication data and the same algorithms) as items of information generated by a physical security token (e.g., a YubiKey™) such that both authentication techniques may be utilized within a single authentication system.

Figure 4A:
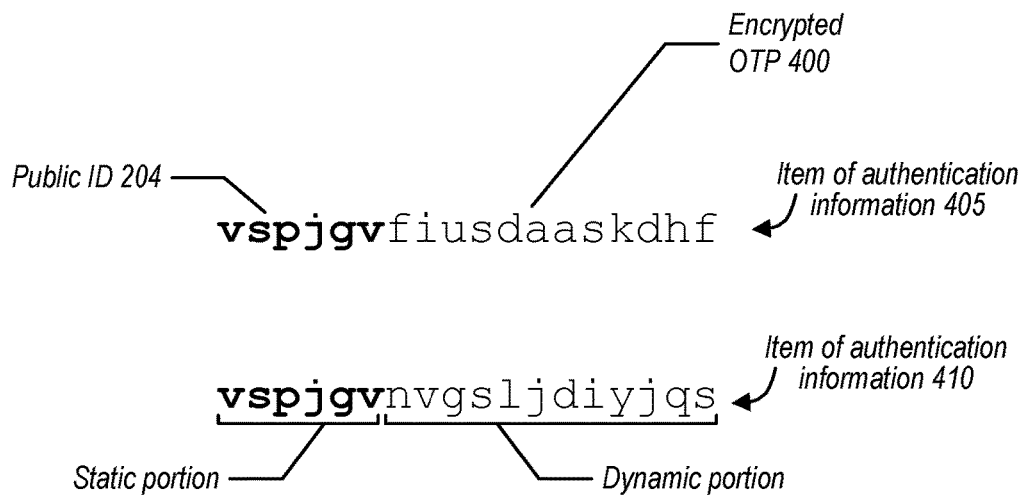
FIG. 4A illustrates example items of authentication information, according to some embodiments.

Turning now to FIG. 4A, example items of authentication information 405 and 410 are depicted, according to some embodiments. In the depicted embodiment, 405 and 410 are two successively generated items of authentication information.

As shown in FIG. 4A, the items of authentication information 405 and 410 have two portions. The first portion, a static portion (shown in bold for emphasis), remains the same for successively generated items of authentication information. For example, in FIG. 4A, the static portion is the first six characters (e.g., "vspjgv") of the items of authentication information 405 and 410. In various embodiments, the static portion of an item of authentication information is (or is derived from) the public ID 204 provided as part of the authentication data 202. In various embodiments, the public ID 204 may be used by the authentication module 114 to retrieve its corresponding copy of the authentication data 202 when verifying a proffered item of authentication information during an authentication operation.

Items of authentication information 405 and 410 further include a dynamic portion, which, as shown, differ for successively generated items of authentication information. In FIG. 4A, the dynamic portion is the last twelve characters of items of authentication information 405 and 410. In various embodiments, the dynamic portion may be an OTP, an encrypted OTP, or some other dynamically generated value. In the depicted embodiment, for example, the dynamic portion of 405 and 410 is an encrypted OTP 400.

Figure 4B:
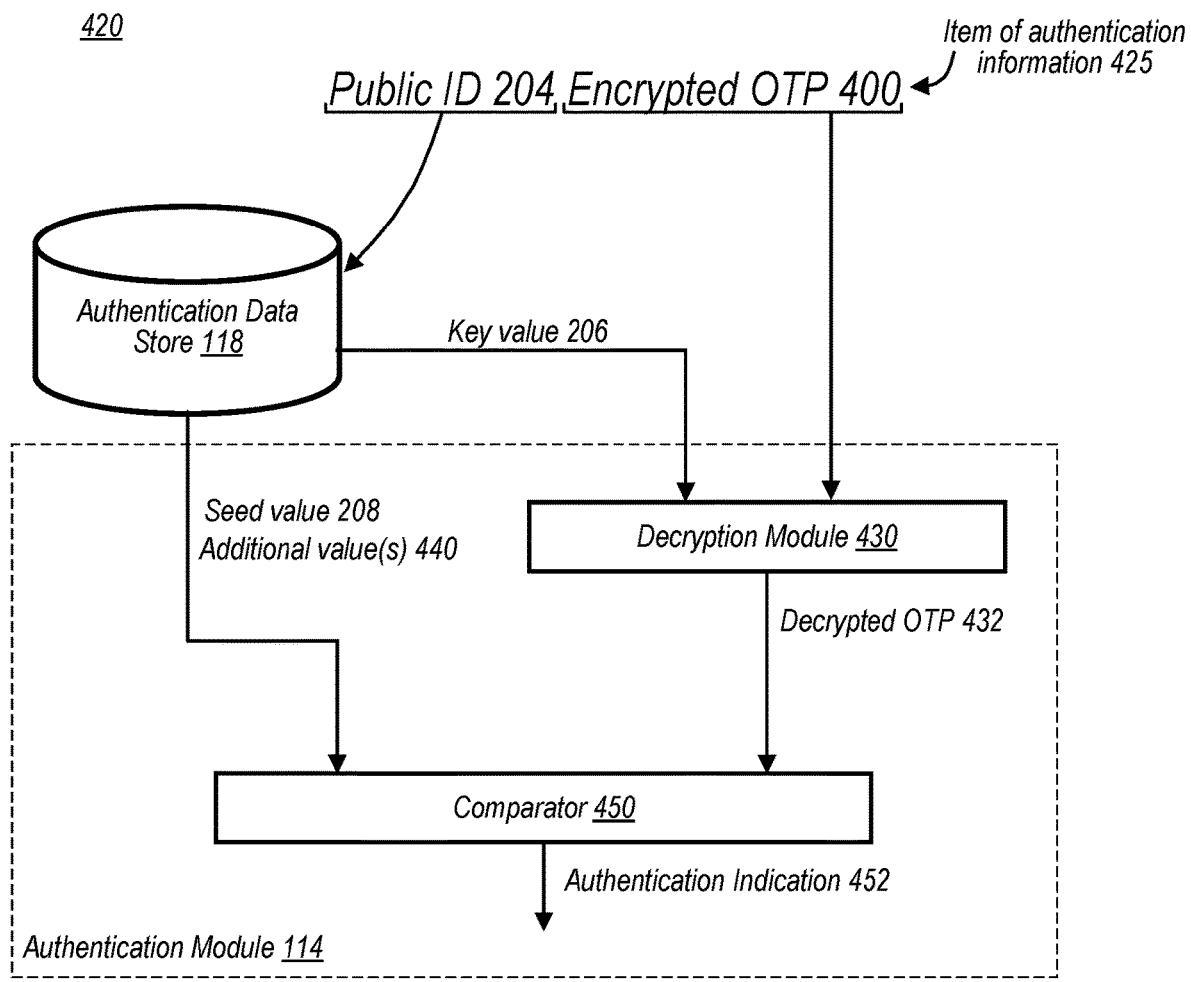
FIG. 4B is a block diagram illustrating an example embodiment in which an authentication module determines whether to authenticate a client application 104 based on an item of authentication information, according to some embodiments.

In FIG. 4B, block diagram 420 depicts an example embodiment in which authentication module 114 determines whether to authenticate a client application 104 based on an item of authentication information 425.

In the depicted embodiment, authentication module 114 is presented with item of authentication information 425 during an authentication operation. As shown, item of authentication information 425 includes public ID 204 and encrypted OTP 400. In various embodiments, authentication module 114 uses the public ID 204 to retrieve authentication data 202 associated with the requesting user. For example, authentication module 114 may execute a query against a database in which the authentication data store 118 is implemented, which, as shown, may be used to retrieve the key value 206 and seed value 208 associated with the requesting user.

Authentication module 114 of FIG. 4B includes decryption module 430, which, in various embodiments, is operable to decrypt the encrypted OTP 400 using the key value 206. As noted above, in some embodiments, the authentication application 106 and authentication module 114 may use any of various suitable symmetric or asymmetric cryptographic algorithms (e.g., AES, RSA, etc.) to respectively encrypt and decrypt an OTP included in an item of authentication information. In the depicted embodiment, for example, decryption module 430 uses the key value 206 and the AES algorithm to generate decrypted OTP 432.

Authentication module 114 of FIG. 4B further includes comparator 450. As noted above, in some embodiments, an OTP generated by the authentication application 106 may include a string of concatenated values, including, for example, internally stored values and values generated based on authentication data 202. Non-limiting examples of such values include seed value 208, a private identifier value, a usage counter value, a timestamp value, a session usage counter value, a random number, a checksum value, etc. In various embodiments, such values may be stored in authentication data store 118 along with other authentication data 202 and retrieved, during authentication, using the key value 206. In various embodiments, comparator 450 is operable to compare the decrypted OTP 432 (received from the client application 104) and one or more of these values and generate an authentication indication 452. In various embodiments, authentication indication 452 may be expressed as a Boolean value, numeric value, or in any other suitable format that specifies the outcome of the comparison performed by comparator 450. Authentication indication 452 may, in various embodiments, be provided to client application 104 and may indicate whether the user is authenticated to the host 112. For example, in response to the locally stored seed value 208 and one or more additional value(s) 440 (e.g., a private identifier value) matching corresponding values contained in the decrypted OTP 432, authentication indication 452 may indicate that the client application 104 is authenticated to the host 112. If, however, the locally stored values do not match the corresponding values in decrypted OTP 432, authentication indication 452 may indicate that the client application 104 is not authenticated to the host 112, and authentication module 114 may take one or more corrective actions, such as denying the user access to the host 112, initiating additional authentication operations, etc.

Note that, in some embodiments (e.g., embodiments in which the OTP that is included in an item of authentication information is generated by the authentication application 106 using HOTP, TOTP, or any other suitable OTP generation algorithm), authentication module 114 may further include an authentication information generator that, in various embodiments, is operable to generate a locally generated OTPs based on the seed value 208 and key value 206. As discussed above with reference to authentication information generator 302, such an authentication information generator may use any of various algorithms (e.g., HOTP, TOTP, etc.) to generate OTPs. In such embodiments, comparator 450 may compare the locally generated OTPs with the decrypted OTP 432 to generate authentication indication 452 (instead of or in addition to comparing one or more stored values, for example). Although authentication application 106 and authentication module 114 may use various algorithms to generate OTPs, note that, in various embodiments, both authentication application 106 and authentication module 114 use the same algorithm when generating OTPs for use in items of authentication information.

Example Methods

Figure 5:
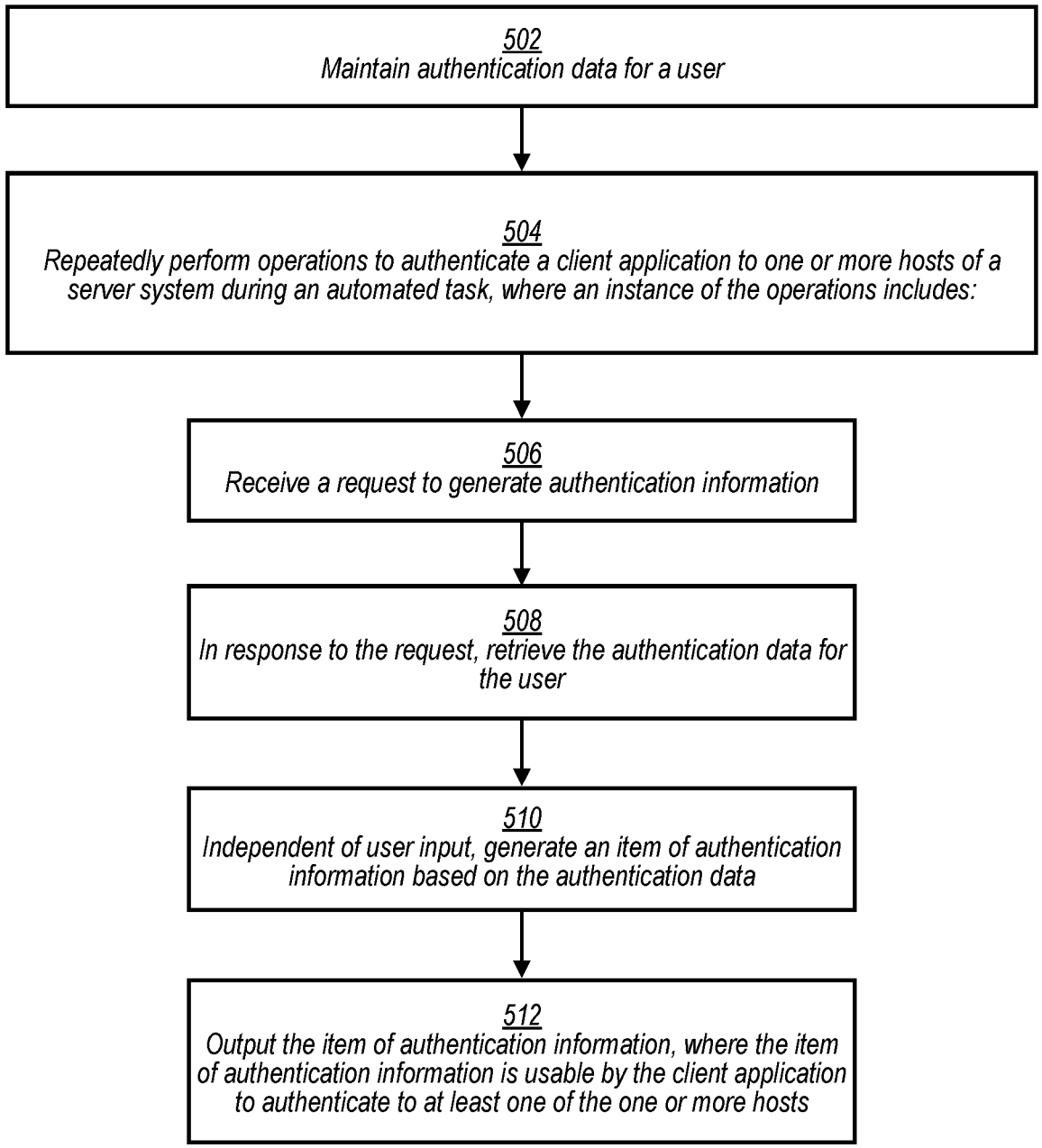
FIG. 5 is a flow diagram illustrating an example method for generating authentication information independent of user input, according to some embodiments.

Referring now to FIG. 5, a flow diagram illustrates an example method 500 for generating authentication information independent of user input, according to some embodiments. In various embodiments, method 500 may be performed by authentication application 106 of FIG. 1 to authenticate client application 104 to one or more hosts 112 of server system 110 during an automated task. For example, client device 102 may include (or have access to) a non-transitory, computer-readable medium having program instructions stored thereon that are executable by the client device 102 to cause the operations described with reference to FIG. 5. In FIG. 5, method 500 includes elements 502-512. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, a client device maintains authentication data for a user. For example, client device 102 stores authentication data 202, which, in some embodiments, is generated by a server system and provided to the authentication application 106 during a registration process. In some embodiments, the authentication data includes an identifier associated with the authentication application (e.g., public ID 204), a symmetric key (e.g., key value 206), and a seed value (e.g., seed value 208). As discussed above, in some embodiments the authentication data is limited-use authentication data on which the server system has imposed one or more limitations. For example, in some embodiments, the limited-use authentication data is usable by the authentication application to generate valid items of authentication information for a limited time period, for a limited set of tasks (e.g., automated tasks), for a limited geographic area, etc.

At 504, in the illustrated embodiment, the authentication application repeatedly performs operations to authenticate a client application to one or more hosts of a server system during an automated task. Stated differently, the authentication application may supply items of authentication information to the client application in an on-demand manner and without user input. For example, while client device 102 may receive some user input while authentication application 106 generates items of authentication information, the generation of the authentication information is not dependent on any such user input or direction. In some embodiments, an instance of the operations includes elements 506-512. In some such embodiments, elements 506-512 may be repeated, by the authentication application 106, for each host 112 to which the client application 104 is attempting to access.

At 506, in the illustrated embodiment, the authentication application receives a request to generate authentication information. For example, the client application may use a function call to request an item of authentication information from the authentication application 106. At 508, in the illustrated embodiment, the authentication application retrieves authentication data associated with the user in response to the request.

At 510, in the illustrated embodiment, the authentication application generates an item of authentication information, based on the authentication data, independent of user input (that is, without user input or direction). In some embodiments, a given item of authentication information includes an OTP. Further, in various embodiments, the authentication application may generate the OTP using any suitable algorithm, such as the HMAC-based OTP algorithm, the TOTP algorithm, etc. Additionally, in some embodiments, an item of authentication information may include an encrypted OTP. For example, as discussed above with reference to FIG. 3, authentication application 106 may generate an item of authentication information by generating an OTP, encrypting that OTP using key value 206 and the AES algorithm, and appending that encrypted OTP to the public ID 204.

At 512, in the illustrated embodiment, the authentication application outputs the item of authentication information, where the item of authentication information is usable by the client application to authenticate to at least one of the one or more hosts in server system 110. For example, the client application 104 may send the item of authentication information (either with or without other authentication credentials, such as a username and password) to the server system 110 for authentication.

As discussed above, in some embodiments, the server system 110 may revoke authentication data stored by the client device 102. For example, in some embodiments, the client device 102 may receive, from the server system, a notification that an authentication attempt to authenticate the client application to one of the one or more hosts has failed and, subsequent to the notification, the authentication application 106 may delete the authentication data from the computing device 102. Further, in some embodiments, the server system 110 may provision updated authentication data after prior authentication data has been revoked. For example, if desired, subsequent to receiving the notification, the client device may initiate registration operations with the server system to obtain updated authentication data that is usable by the authentication application to authenticate the client application to one or more hosts of the server system. Additionally note that, in some embodiments, the authentication application 106 may be executing on a separate computing device than the client application 104. For example, in one such embodiment, client application 104 may be executing on a laptop computer and authentication application 106 may be executing on a dongle, a smartphone, a tablet computer, or any other suitable computing device that is coupled (e.g., via USB, NFC, Bluetooth, etc.) to the computing device on which the client application is being executed.

Example Computer System

Figure 6:
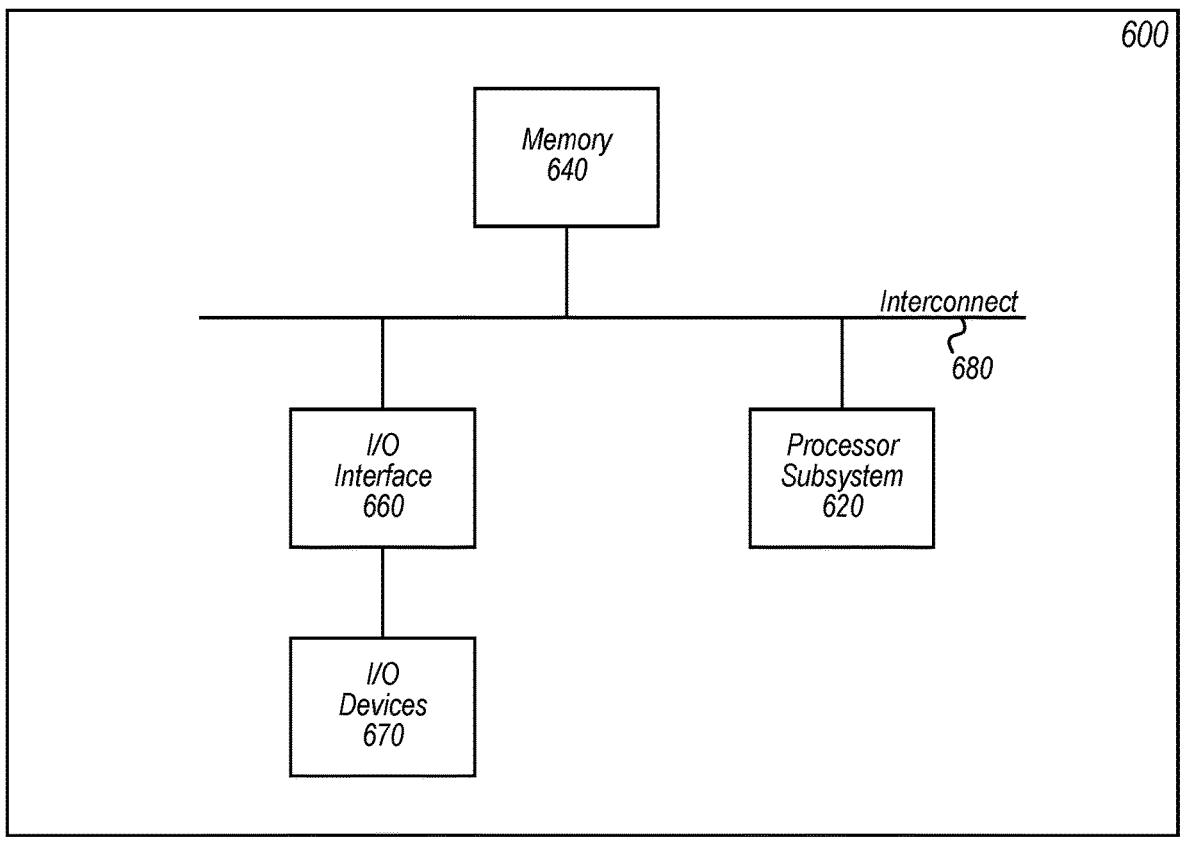
FIG. 6 is a block diagram illustrating an example computer system, according to some embodiments.

Referring now to FIG. 6, a block diagram of an example computer system 600 is depicted, which may implement one or more computer systems, such as client device 102 or any of various hosts 112 in server system 110 of FIG. 1, according to various embodiments. Computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 600 is shown in FIG. 6 for convenience, computer system 600 may also be implemented as two or more computer systems operating together.

Processor subsystem 620 may include one or more processors or processing units. In various embodiments of computer system 600, multiple instances of processor subsystem 620 may be coupled to interconnect 680. In various embodiments, processor subsystem 620 (or each processor unit within 620) may contain a cache or other form of on-board memory.

System memory 640 is usable to store program instructions executable by processor subsystem 620 to cause system 600 perform various operations described herein. System memory 640 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as system memory 640. Rather, computer system 600 may also include other forms of storage such as cache memory in processor subsystem 620 and secondary storage on I/O devices 670 (e.g., a hard drive, storage array, etc.). In some embodiments, these other forms of storage may also store program instructions executable by processor subsystem 620.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 670 includes a network interface device (e.g., configured to communicate over WiFi, Bluetooth, Ethernet, etc.), and computer system 600 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

In this disclosure, various "modules" operable to perform designated functions are shown in the figures and described in detail above (e.g., authentication module 114, authentication information generator 302, decryption module 430, comparator 450, etc.). As used herein, the term "module" refers to circuitry configured to perform specified operations or to physical, non-transitory, computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
  maintaining, by a computing device, authentication data for a user;
  repeatedly performing, by an authentication application executing on the computing device, operations to authenticate a client application to a plurality of hosts of a server system while the client application is performing an automated task using the plurality of hosts, wherein an instance of the operations includes:
  receiving, from the client application, a request to generate authentication information; in response to the request, retrieving the authentication data for the user;
  independent of user input, generating an item of authentication information based on the authentication data; and
  outputting the item of authentication information to the client application, wherein the item of authentication information is usable by the client application to authenticate to at least one of the plurality of hosts;
  wherein the item of authentication information includes a one-time passcode, and wherein the generating the item of authentication information includes using a hash-based one-time password algorithm to generate the one-time passcode.

2. The method of claim 1, wherein the authentication data is limited-use authentication data that is usable by the authentication application to generate valid items of authentication information for a limited time period.

3. The method of claim 1, further comprising: receiving, from the server system, a notification that an authentication attempt to authenticate the client application to one of the plurality of hosts has failed; and subsequent to the notification, deleting the authentication data from the computing device such that the authentication application is no longer operable to generate items of authentication information based on the authentication data.

4. The method of claim 3, further comprising: subsequent to the receiving the notification, initiating registration operations with the server system to obtain updated authentication data that is usable by the authentication application to authenticate the client application to one or more hosts of the server system.

5. The method of claim 1, wherein the authentication data includes an identifier associated with the authentication application, a symmetric key, and a seed value.

6. The method of claim 1, wherein the authentication data is generated by the server system and provided to the authentication application during a registration process.

7. The method of claim 1, wherein the automated task is a computer maintenance operation involving a plurality threshold number of computing operations without user direction.

8. A non-transitory, computer-readable medium having instructions stored thereon that are capable of execution by a computing device to perform operations comprising:
   maintaining authentication data for a user;
   performing, by an authentication application, operations to authenticate a client application to a plurality of hosts of a server system while the client application is performing an automated task using the plurality of hosts, wherein an instance of the operations includes:
      receiving, from the client application, a request to generate authentication information;
      in response to the request, retrieving the authentication data for the user;
      independent of user input, generating an item of authentication information based on the authentication data; and
      outputting the item of authentication information to the client application, wherein the item of authentication information is usable by the client application to authenticate to at least one of the plurality of hosts;
   wherein the item of authentication information includes a one-time passcode, and wherein the generating the item of authentication information includes using a time-based one-time password algorithm to generate the one-time passcode.

9. The non-transitory, computer-readable medium of claim 8, wherein the authentication data is limited-use authentication data that is usable by the authentication application to generate valid items of authentication information for a limited time period.

10. The non-transitory, computer-readable medium of claim 8, wherein the operations further comprise: receiving, from the server system, a notification that an authentication attempt to authenticate the client application to one of the plurality of hosts has failed; and subsequent to the notification, deleting the authentication data from the computing device such that the authentication application is no longer operable to generate items of authentication information based on the authentication data.

11. The non-transitory, computer-readable medium of claim 10, wherein the operations further comprise: subsequent to the receiving the notification, initiating registration operations with the server system to obtain updated authentication data that is usable by the authentication application to authenticate the client application to one or more hosts of the server system.

12. The non-transitory, computer-readable medium of claim 8, wherein the authentication data includes an identifier associated with the authentication application, a symmetric key, and a seed value.

13. A method, comprising:
   receiving, by an authentication application executing on a computing device, a request for authentication information from a client application, wherein the client application is operable to perform an automated task on a plurality of hosts of a server system;
   without user input, the authentication application supplying an item of authentication information to the client application in response to the request, including by:
      accessing authentication data associated with the server system, wherein the authentication data includes a cryptographic key value and an identifier value;
      generating a one-time passcode;
      creating the item of authentication information based on the identifier value and an encrypted version of the one-time passcode; and
   outputting the item of authentication information to the client application, wherein the item of authentication information is usable by the client application to authenticate to at least one of the plurality of hosts while the client application is performing the automated task using the plurality of hosts;
   wherein the item of authentication information includes a one-time passcode, and wherein the generating the item of authentication information includes using a hash-based one-time password algorithm to generate the one-time passcode.

14. The method of claim 13, wherein the authentication data is limited-use authentication data that is usable by the authentication application to generate valid items of authentication information for a limited set of automated tasks.

15. The method of claim 13, wherein the authentication application and the client application are executing on separate computing devices.

16. The method of claim 13, further comprising: receiving, from the server system, a notification that an authentication attempt to authenticate the client application to one of the plurality of hosts has failed; and subsequent to the notification, deleting the authentication data from the computing device such that the authentication application is no longer operable to generate items of authentication information based on the authentication data.

17. The method of claim 16, further comprising: subsequent to the receiving the notification, initiating registration operations with the server system to obtain updated authentication data that is usable by the authentication application to authenticate the client application to one or more hosts of the server system.

18. The method of claim 13, wherein the automated task includes a patching operation for one or more of the plurality of hosts of the server system.

* * * * *